United States Patent
Nishimura

(10) Patent No.: US 12,485,920 B2
(45) Date of Patent: Dec. 2, 2025

(54) AUTONOMOUS DRIVING SYSTEM, CONTROL METHOD FOR AUTONOMOUS DRIVING SYSTEM, AND MOBILE DEVICE CASE FOR AUTONOMOUS DRIVING SYSTEM

(71) Applicant: TOYOTA JIDOSHA KABUSHIKI KAISHA, Toyota (JP)

(72) Inventor: Naoki Nishimura, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 106 days.

(21) Appl. No.: 18/652,252

(22) Filed: May 1, 2024

(65) Prior Publication Data

US 2024/0375680 A1  Nov. 14, 2024

(30) Foreign Application Priority Data

May 11, 2023  (JP) ................................. 2023-078410

(51) Int. Cl.
*B60W 60/00* (2020.01)
*B60W 50/14* (2020.01)
*H04M 1/72463* (2021.01)

(52) U.S. Cl.
CPC .......... *B60W 60/001* (2020.02); *B60W 50/14* (2013.01); *H04M 1/724631* (2022.02); *B60W 2050/146* (2013.01)

(58) Field of Classification Search
None
See application file for complete search history.

(56) References Cited

U.S. PATENT DOCUMENTS

| | | | |
|---|---|---|---|
| 2015/0099480 A1* | 4/2015 | Reiter | H04W 4/027 455/418 |
| 2018/0345980 A1 | 12/2018 | Morita et al. | |
| 2020/0156472 A1 | 5/2020 | Fukasawa | |
| 2024/0217560 A1* | 7/2024 | Doell | B60K 35/22 |

FOREIGN PATENT DOCUMENTS

| | | |
|---|---|---|
| JP | 6063854 B2 | 1/2017 |
| JP | 6917708 B2 | 8/2021 |
| JP | 2021-146743 A | 9/2021 |
| JP | 7070357 B2 | 5/2022 |

* cited by examiner

*Primary Examiner* — Donald J Wallace
*Assistant Examiner* — Paysun Wu
(74) *Attorney, Agent, or Firm* — Dinsmore & Shohl LLP

(57) ABSTRACT

An autonomous driving system connected communicably to a mobile device of a driver or to a mobile device case attached to the mobile device, and configured to perform autonomous driving control. the autonomous driving system comprises a display cover of the mobile device case, capable of switching a display of the mobile device between a visible state and a shielded state. The display of the mobile device is switched from the visible state to the shielded state by controlling the mobile device or the mobile device case, when the driver is requested to perform a driving operation of a vehicle during the autonomous driving control.

15 Claims, 7 Drawing Sheets

AUTONOMOUS DRIVING SYSTEM, CONTROL METHOD FOR AUTONOMOUS DRIVING SYSTEM, AND MOBILE DEVICE CASE FOR AUTONOMOUS DRIVING SYSTEM

CROSS-REFERENCE TO RELATED APPLICATIONS

This application is based upon and claims the benefit of priority from Japanese Patent Application No. 2023-078410, filed on May 11, 2023, the entire contents of which are incorporated herein by reference.

TECHNICAL FIELD

The present disclosure relates to an autonomous driving system, a control method for an autonomous driving system, and a mobile device case for an autonomous driving system.

BACKGROUND

Japanese Patent No. 6917708 has been known as a technical document related to an autonomous driving system. This publication discloses that it is determined whether or not a driver is looking at a display of a mobile device during autonomous driving control of a vehicle on the basis of an image captured by a capturing device, and when it is determined that the driver is looking at the display, an alarm corresponding to a level of autonomous driving control is issued.

SUMMARY

However, when the driver concentrates on the operation of the mobile device, the driver may not notice the alarm output from the vehicle. It is also conceivable that the driver is wearing earphones. Therefore, there is a need for a technique for attracting the attention of the driver who is concentrating on the operation of the mobile device back to the vehicle.

An autonomous driving system according to an aspect of the present disclosure connected communicably to a mobile device of a driver or to a mobile device case attached to the mobile device, and configured to perform autonomous driving control. the autonomous driving system comprises a display cover of the mobile device case, capable of switching a display of the mobile device between a visible state and a shielded state. The display of the mobile device is switched from the visible state to the shielded state by controlling the mobile device or the mobile device case, when the driver is requested to perform a driving operation of a vehicle during the autonomous driving control.

In the autonomous driving system according to the aspect of the present disclosure, when the driver is requested to perform a driving operation of the vehicle during the autonomous driving control, a display of a mobile device is switched from a visible state to a shielded state. As a result, in the autonomous driving system, even if the driver concentrates on the operation of the mobile device, the driver's attention can be directed to taking over the driving.

The autonomous driving system according to the aspect of the present disclosure may be connected communicably to the mobile device case. The autonomous driving control may not be initiated unless the mobile device case is attached to the mobile device.

In the autonomous driving system according to the aspect of the present disclosure, the display cover may include an opening and closing mechanism capable of obscuring a display of the mobile device. The display of the mobile device may be switched from the visible state to the shielded state by obscuring the display using the opening and closing mechanism.

In the autonomous driving system according to the aspect of the present disclosure, the display cover may include a variable transmittance screen covering the display of the mobile device. The display is switched from the visible state to the shielded state by changing a transmittance of the variable transmittance screen.

In the autonomous driving system according to the aspect of the present disclosure, the display of the mobile device may be returned from the shielded state to the visible state when the driving operation of the driver is detected after the display of the mobile device is switched from the visible state to the shielded state.

According to another aspect of the present disclosure, there is provided a control method for an autonomous driving system. The autonomous driving system is connected communicably to the mobile device of a driver or to a mobile device case attached to the mobile device and configured to perform autonomous driving control. The control method includes switching a display of the mobile device from a visible state to a shielded state by controlling the mobile device or the mobile device case, when the driver is requested to perform a driving operation of a vehicle during the autonomous driving control. The mobile device case includes a display cover capable of switching the display of the mobile device between the visible state and the shielded state.

In the control method according to another aspect of the present disclosure, when the driver is requested to perform a driving operation of the vehicle during the autonomous driving control, a display of a mobile device is switched from a visible state to a shielded state. As a result, in the autonomous driving system, even if the driver concentrates on the operation of the mobile device, the driver's attention can be directed to taking over the driving.

According to still another aspect of the present disclosure, there is provided a mobile device case connected communicably an autonomous driving system of a vehicle and attached to a mobile device of a driver of the vehicle. The mobile device case includes a display cover. The display cover disposed with respect to a display of the mobile device and capable of switching the display between a visible state and a shielded state. The display of the mobile device is switched from the visible state to the shielded state when the driver is requested to perform a driving operation of the vehicle during the autonomous driving control.

In the mobile device case according to still another aspect of the present disclosure, when the driver is requested to perform a driving operation of the vehicle during the autonomous driving control, the display of the mobile device is switched from the visible state to the shielded state. As a result, in the autonomous driving system, even if the driver concentrates on the operation of the mobile device, the driver's attention can be directed to taking over the driving.

In the mobile device case according to still another aspect of the present disclosure, the autonomous driving control may not be initiated by the autonomous driving system unless the mobile device case is attached to the mobile device.

The mobile device case according to still another aspect of the present disclosure may include an opening and closing mechanism capable of obscuring a display of the mobile device. The display of the mobile device may be switched from the visible state to the shielded state by obscuring the display using the opening and closing mechanism.

The mobile device case for autonomous driving system according to still another aspect of the present disclosure may include a variable transmittance screen covering the display of the mobile device, and the display is switched from the visible state to the shielded state by changing a transmittance of the variable transmittance screen.

In the mobile device case according to still another aspect of the present disclosure, the display of the mobile device may be returned from the shielded state to the visible state when the autonomous driving system detects a driving operation of the driver after the display of the mobile device is switched from the visible state to the shielded state.

According to each aspect of the present disclosure, the driver's attention can be promptly turned to the driving change of the vehicle when the driver is requested to perform a driving operation of the vehicle during the autonomous driving control.

DETAILED DESCRIPTION

Hereinafter, embodiments of the present disclosure will be described with reference to the drawings.

Figure 1:
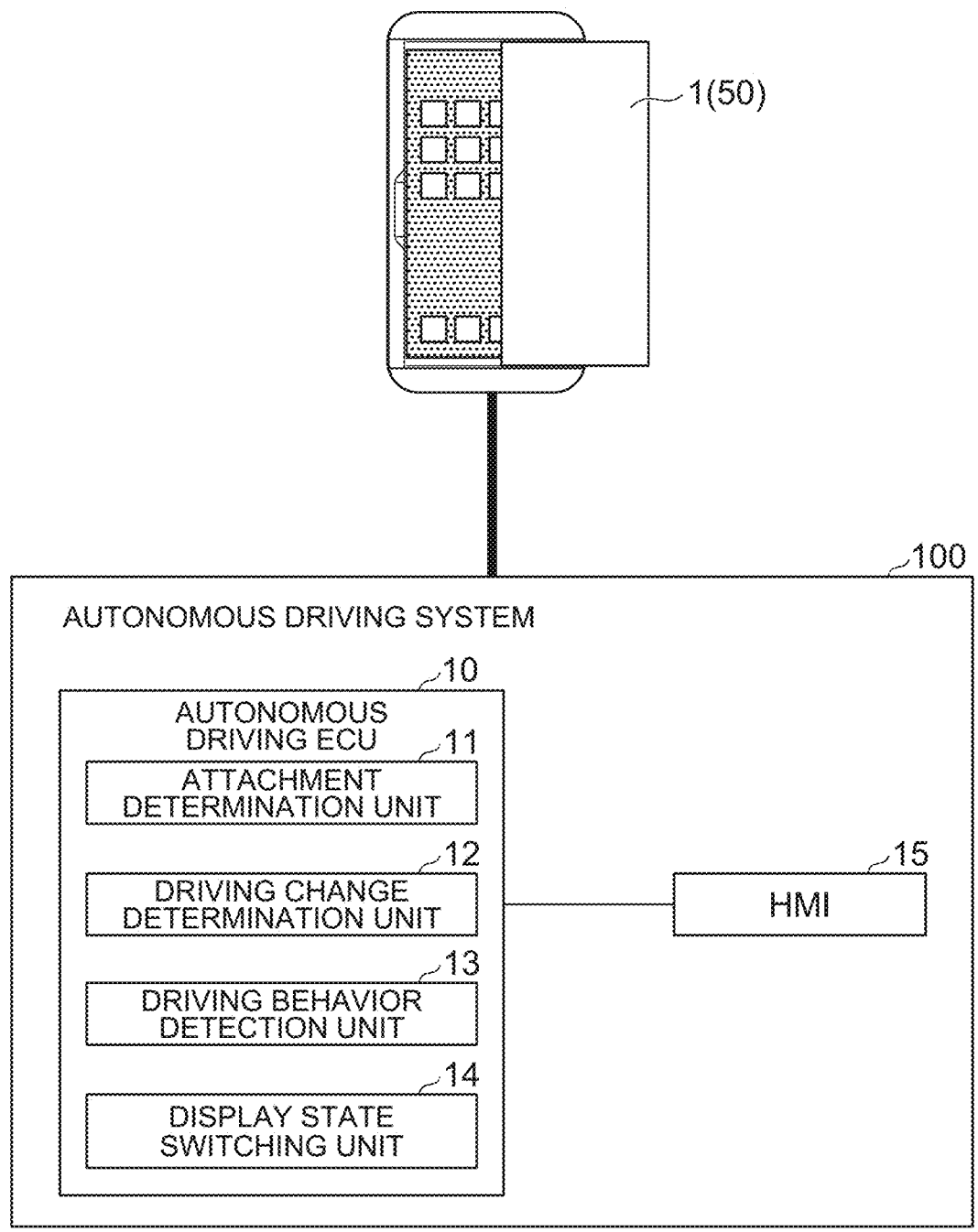
FIG. 1 is a diagram illustrating an autonomous driving system according to an embodiment.

FIG. 1 is a diagram illustrating an autonomous driving system according to an embodiment. An autonomous driving system 100 shown in FIG. 1 is a system which is mounted on a vehicle such as a passenger vehicle or a cargo vehicle. The autonomous driving system 100 performs autonomous driving control of the vehicle. Autonomous driving control is vehicle control for causing a vehicle to automatically travel along a route set in advance. In the autonomous driving control, the driver does not need to perform a driving operation, and the vehicle travels automatically.

The autonomous driving system 100 is provided with an autonomous driving ECU 10 [Electronic Control Unit] that centrally manages the system. The autonomous driving ECU 10 is an electronic control unit including a storage unit and a CPU [Central Processing Unit]. The storage unit may include a ROM [Read Only Memory] or a RAM [Random Access Memory] or an EEPROM [Electrically Erasable Programmable Read-Only Memory]. In the autonomous driving ECU 10, for example, various functions are realized by executing a program stored in the storage unit by the CPU. The autonomous driving ECU 10 may be composed of a plurality of electronic units. Details of the autonomous driving ECU 10 will be described later.

The autonomous driving system 100 has a mobile device case 1 that is attached to a mobile device 50 of the driver of the vehicle. The mobile device 50 is a mobile information device owned by the driver. The mobile device 50 is, for example, a smartphone. As an example, the mobile device 50 is configured by a computer including a processor, a memory, a communication device, and an interface. The processor is, for example, a CPU. The memory is, for example, a ROM, a RAM, or an EEPROM. The interface may include a touch screen that integrates a touch panel and a display. The mobile device 50 need not necessarily have a telephone function or a camera function. The mobile device 50 is connected to the autonomous driving system 100 by wireless communication or by wire. The mobile device 50 may be pre-registered with the autonomous driving system 100 as the driver's mobile device.

The mobile device case 1 is a terminal case attached to the mobile device 50. The mobile device case 1 may be formed as a rectangular case that is attached to a rectangular plate like the mobile device 50. The mobile device case 1 is configured to switch the display of the mobile device 50 from the visible state to the shielded state. The visible state is a state in which the display of the mobile device 50 is viewable by the driver. The shielded state is a state in which the display of the mobile device 50 is invisible to the driver.

The mobile device case 1 switches the display of the mobile device 50 from the visible state to the shielded state, for example by obscuring the display with a mechanical opening and closing mechanism. The opening and closing mechanism is a mechanism that can obscure the display of the mobile device 50. The mobile device case 1 may switch the display of the mobile device 50 from the visible state to the shielded state by changing the transmittance of a variable transmittance screen that covers the display of the mobile device 50. The details will be described later.

The mobile device case 1 is connected to the autonomous driving system 100 by a communication cable. The standard, type, and length of the communication cable are not particularly limited. The mobile device case 1 may be connected to the autonomous driving system 100 by wireless communication instead of wired communication. The mobile device case 1 switches the display of the mobile device 50 from the visible state to the shielded state with a signal from the autonomous driving system when the autonomous driving system 100 requests the driver to operate the vehicle during autonomous driving control.

Configuration of Mobile Device Case for Autonomous Driving System

Figure 2A:
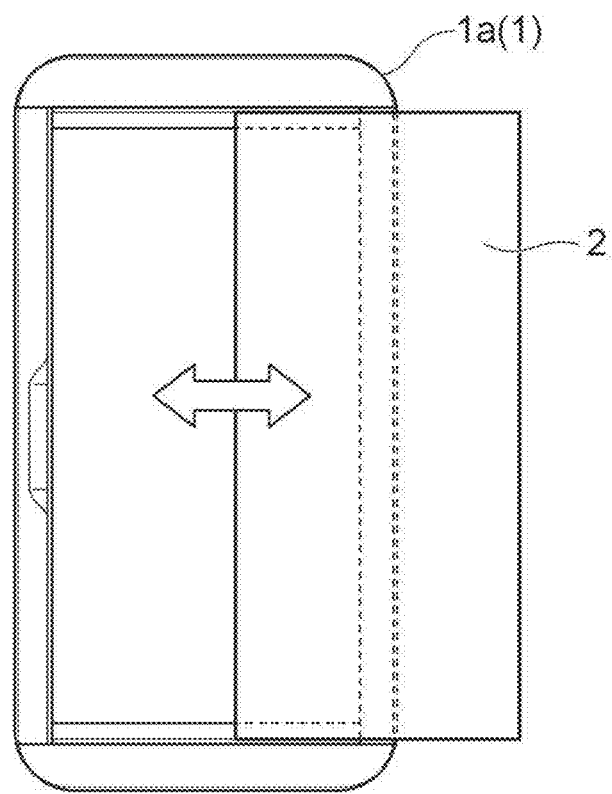
FIG. 2A is a diagram illustrating an example of a display cover of a mobile device case for autonomous driving system.
Figure 2B:
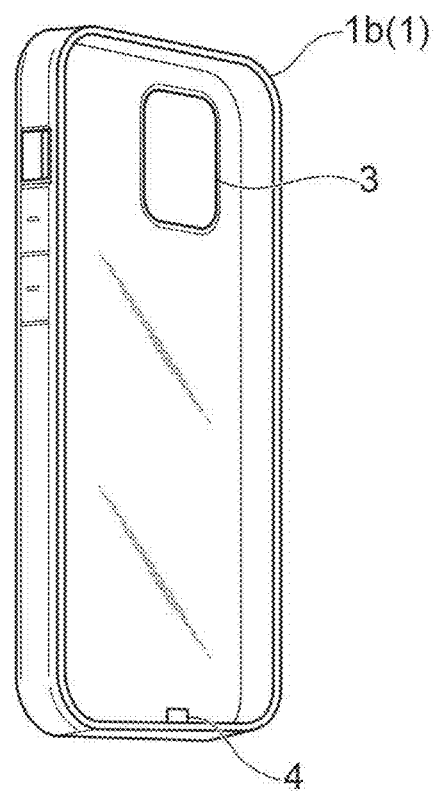
FIG. 2B is a diagram showing an example of the main body of the mobile device case for autonomous driving system viewed from the front.

Hereinafter, an example of the configuration of the mobile device case 1 will be described. FIG. 2A is a diagram illustrating an example of a display cover 1*a* of the mobile device case 1. FIG. 2B is a diagram showing an example of a main body 1*b* of the mobile device case 1 viewed from the front.

As illustrated in FIG. 2A and FIG. 2B, the mobile device case 1 has the display cover 1*a* and the main body 1*b*. The display cover 1*a* and the main body 1*b* are assembled so as to sandwich the mobile device 50, and form a box-like case covering the mobile device 50. The display cover 1a and the main body 1b do not need to be independent members and may be partially connected.

The display cover 1a is arranged with respect to the display of the mobile device 50, and is configured to switch the display of the mobile device 50 from a visible state to a shielded state. As illustrated in FIG. 2A, the display cover 1a has an opening and closing mechanism 2. The opening and closing mechanism 2 is a mechanism for mechanically switching the display of the mobile device 50 between a visible state and a shielded state. The opening and closing mechanism 2 may be of a slide type or a rotary hinge type as long as it can shield the display of the mobile device 50. The opening and closing mechanism 2 does not necessarily need to shield the entire display of the mobile device 50 but may shield a part of the display. The opening and closing mechanism 2 is automatically opened and closed by driving a small motor to be described later. The mobile device case 1 may transmit a signal to the autonomous driving system 100 each time the opening and closing mechanism 2 is opened or closed.

As illustrated in FIG. 2B, the main body 1b has a camera opening 3 for exposing the camera unit on the back surface of the mobile device 50 and a mobile device connection terminal 4 to be inserted into the charging port of the mobile device 50. The main body 1b does not necessarily have to cover the back surface of the mobile device 50 and may be a frame-shaped member. Also, the main body 1b need not necessarily have the camera opening 3.

The mobile device connection terminal 4 is provided so as to protrude from the inside of the main body 1b. The position of the mobile device connection terminal 4 is fixed so as to be inserted into the charging port of the mobile device 50 when the case is attached. The mobile device connection terminal 4 is not limited in shape as long as it can be mechanically connected to the mobile device 50.

Figure 3A:
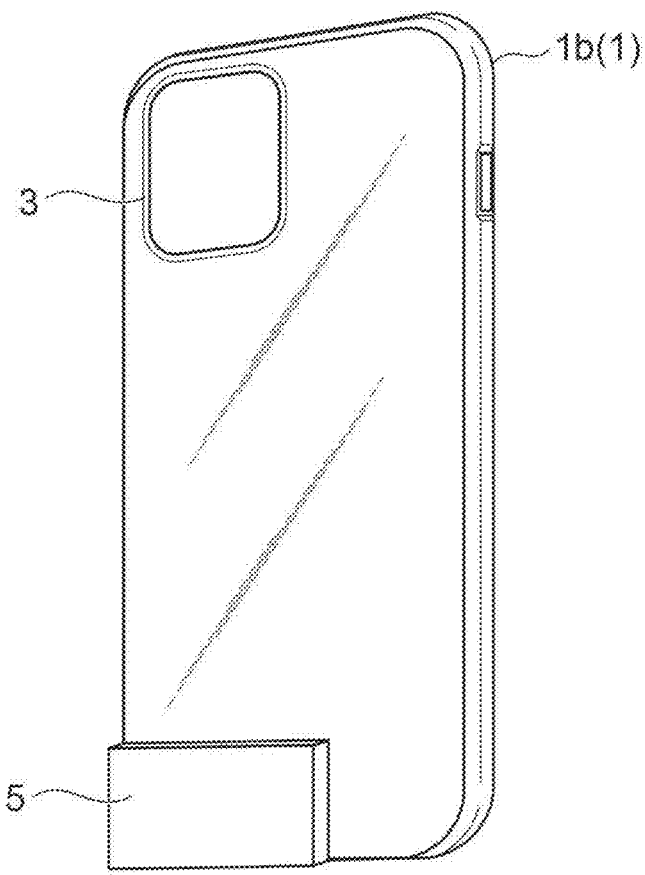
FIG. 3A is a diagram showing an example of the main body of the mobile device case for autonomous driving system viewed from the back.

FIG. 3A is a diagram showing an example of the main body 1b of the mobile device case 1 viewed from the back. As illustrated in FIG. 3A, an integrated circuit box (IC-box) 5 is provided at a lower portion of the back surface of the main body 1b. The IC-box 5 is a part for housing ICs for detecting that the mobile device case 1 is put on the mobile device 50. The IC-box 5 may be implanted in the main body 1b.

Figure 3B:
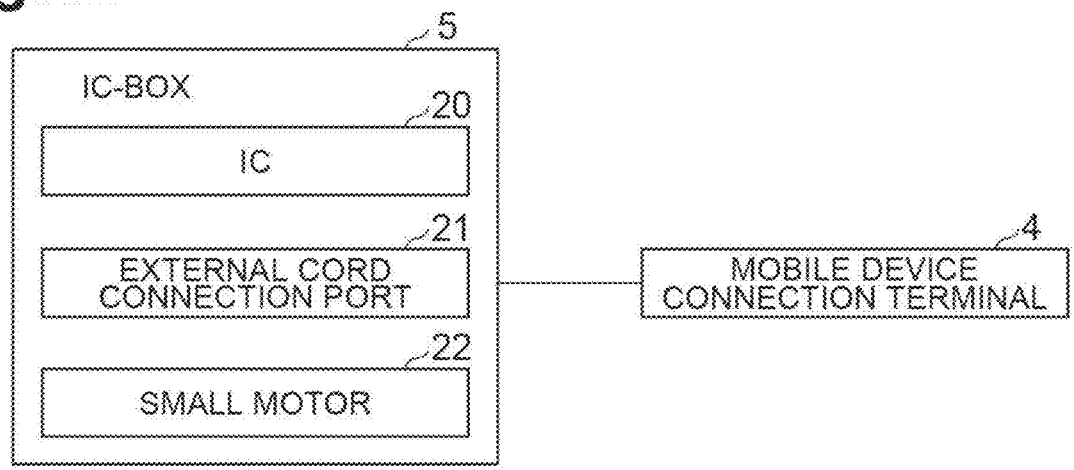
FIG. 3B is a diagram illustrating an example of the configuration of the IC-box.

FIG. 3B is a diagram illustrating an example of the configuration of the IC box 5. As illustrated in FIG. 3B, the integrated circuit box 5 includes integrated circuit (IC) 20, an external cord connection port 21, and a small motor 22. The IC-box 5 is connected to the mobile device connection terminal 4.

The IC 20 detects via the mobile device connection terminal 4 that the main body 1b is attached on the mobile device 50. The IC 20 detects a change in voltage due to, for example, the mobile device connection terminal 4 being connected to the charging port of the mobile device 50. The IC 20 detects attachment of the main body 1b to the mobile device 50 from the detected voltage change. The IC 20 may have an aspect in which the mobile device 50 recognizes the connection of the mobile device connection terminal 4 by a contact switch or the like of the charging port. In this case, the IC 20 detects the wearing of the main body 1b by acquiring a connection signal from the mobile device 50.

In the IC 20, the display cover 1a is assembled to the main body 1b attached to the mobile device 50, thereby detecting the attachment of the mobile device case 1 to the mobile device 50. For example, when a contact switch provided in the main body 1b is pressed due to attachment of the display cover 1a, the IC 20 detects attachment of the display cover 1a to the main body 1b. The IC 20 may detect the imposition of the display cover 1a on the main body 1b by energizing the energizing paths formed in the display cover 1a and the main body 1b, respectively.

The external cord connection port 21 is a site to which a communication cable from the autonomous driving system 100 is connected. Since it is considered that the mobile device case 1 is basically in a state of being connected to the autonomous driving system 100, the case may have a structure that does not come off from the external cord connection port 21 only by pulling the communication cable. The end portion of the communication cable may be screwed to the external cord connection port 21, and may have a latch mechanism for preventing coming off.

The small motor 22 is actuators for opening and closing the opening and closing mechanism 2. The small motor 22 is driven by control signals from the IC 20. The IC 20 transmits a control signal to the small motor 22 based on, for example, a signal from the autonomous driving system 100. The small motor 22 transmits the driving force to the opening and closing mechanism 2 via a gear portion. Thus, the opening and closing mechanism 2 is switched between an open state and a closed state. The power source of the opening and closing mechanism 2 is not limited to a motor. Various known actuators can be employed as the power source for the opening and closing mechanism 2.

Figure 4:
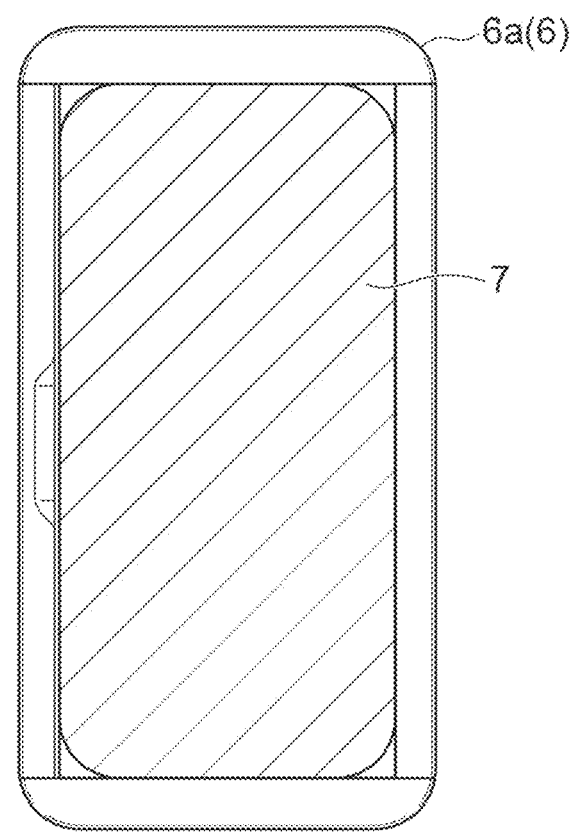
FIG. 4 is a diagram illustrating a display cover of a mobile device case for autonomous driving system according to a modification.

Here, FIG. 4 is a diagram showing a display cover 6a of a mobile device case 6 for autonomous driving system 100 in a modified example. The display cover 6a of the mobile device case 6 shown in FIG. 4 is different from the display cover 1a shown in FIG. 2A. The difference is that the display cover 6a has a variable transmittance screen 7 instead of the opening and closing mechanism 2.

The display cover 6a has a frame-like member so as to surround the outer edge of the mobile device 50 attached to the mobile device case 6, and the variable transmittance screen 7 is provided so as to cover the display of the mobile device 50 seen from the opening. The variable transmittance screen 7 is a display configured to be able to change transmittance of visible light. The variable transmittance screen 7 may be formed of a liquid crystal or an electromagnetic inductive body. The variable transmittance screen 7 changes the transmittance by applying a voltage. The variable transmittance screen 7 switches the display of the mobile device 50 from the visible state to the shielded state by lowering the transmittance. The transmittance may be changed in only two stages of transmission and non-transmission. Further, it may be changeable in multiple stages.

[Configuration of Autonomous Driving System]

Next, the configuration of the autonomous driving system 100 will be described. However, description of the configuration of the known of the autonomous driving system 100 is omitted. The autonomous driving system 100 may have a personal authentication function of the driver, and may have a function of cooperating with the mobile device 50 of the driver.

As illustrated in FIG. 1, the autonomous driving ECU 10 of the autonomous driving system 100 is connected to the HMI 15 of the vehicle. The HMI 15 is an interface for inputting and outputting information between the driver and the autonomous driving ECU 10. The HMI 15 includes a display and a speaker provided in the vehicle cabin. The HMI 15 performs image output of the display and sound output from the speaker in response to the control signal from the autonomous driving ECU 10. The display may be a center display, MID [Multi-Information Display], or HUD [Head Up Display].

Next, the functional configuration of the autonomous driving ECU 10 will be described. As illustrated in FIG. 1, the autonomous driving ECU 10 has an attachment determination unit 11, a driving change determination unit 12, a driving behavior detection unit 13, and a display state switching unit 14.

The attachment determination unit 11 determines whether the mobile device case 1 has been attached to the mobile device 50. The attachment determination unit 11 determines that the mobile device case 1 is attached to the mobile device 50 if the IC 20 detects attachment of the mobile device case 1 to the mobile device 50. The attachment determination unit 11 determines that the mobile device case 1 is attached to the mobile device 50 based on the signal transmitted from the IC 20.

The attachment determination unit 11 may recognize in advance that the mobile device 50 is a mobile device owned by the driver through communication with the mobile device 50. In this case, the attachment determination unit 11 may determine that the mobile device case 1 is attached to the mobile device 50 by a signal from the mobile device 50.

The driving change determination unit 12 determines whether or not a situation in which the driver is requested to change driving has occurred while the autonomous driving control is being executed. The driving change determination unit 12 determines that a situation in which the driver is requested to change driving has occurred if it is detected that the environment is out of the operational design domain [ODD] of autonomous driving control.

For example, the driving change determination unit 12 determines that there is a situation in which the driver is requested to change driving when the vehicle enters an area which is not assumed to be within the operational design domain from an area which is assumed to be within the operational design domain. The area assumed in the operational design domain may be an automobile dedicated road or an autonomous driving road. The area that is not assumed in the operational design domain is, for example, a general road or a road in an urban area. The driving change determination unit 12 may determine that a situation in which the driver is requested to change driving has occurred in a case where the lane width in the construction section in front of the vehicle is narrow and is not assumed to be the operational design domain. The driving change determination unit 12 considers the case where the timing at which a lane change is necessary for arrival at the destination is approaching. In this case, the driving change determination unit 12 may determine that a situation in which the driver is requested to change driving has occurred when the congestion situation around the vehicle is outside the operational design domain and is not assumed. The congestion situation is, for example, a situation in which the vehicle speed of other vehicles around the vehicle is equal to or less than a certain value and the number of other vehicles around the vehicle is equal to or greater than a threshold value. Other indexes of the known may be used to determine the congestion state. In addition, the driving change determination unit 12 can use the condition of the known regarding the driving change during autonomous driving control for the determination.

The driving change determination unit 12 requests the driver to change driving via the HMI 15 when it is determined that the situation of requesting the driver to change driving has occurred. The driving change determination unit 12 requests the driver to change driving by using at least one of the image outputs of the display and the sound outputs of the speaker. For example, the driving change determination unit 12 outputs a voice of "please change driving because autonomous driving control will be ended" as a request for driving change.

After the driving change determination unit 12 requests the driver to change driving, the driving behavior detection unit 13 detects the driving behavior of the driver. The driving behavior detection unit 13 detects that the driver has performed a driving action based on detection signals of, for example, a steering sensor, an accelerator pedal sensor, and a brake pedal sensor of the vehicle. The driving behavior is, for example, an operation of turning a steering wheel of the vehicle by a certain angle or more, an operation of stepping on an accelerator pedal by a certain amount or more, and an operation of stepping on a brake pedal by a certain amount or more.

The driving behavior detection unit 13 may detect the driving behavior based on the detection result of the captured image of the driver monitor camera or the operation of the release button of the autonomous driving control. The driving behavior may include a behavior in which the driver visually recognizes the front of the vehicle and grips the steering wheel with both hands. The driving behavior may include an operation in which the driver actively switches to manual driving by a button operation or a pedal operation.

The display state switching unit 14 controls the mobile device case 1 when the driving change determination unit 12 requests the driver to change driving. Thus, the display state switching unit 14 switches the display of the mobile device 50 from the visible state to the shielded state.

In detail, the display state switching unit 14 switches the display of the mobile device 50 from the visible state to the shielded state by driving the opening and closing mechanism 2 of the mobile device case 1 to switch from the open state to the closed state. The display state switching unit 14 may also change the transmittance of the variable transmittance screen 7 shown in FIG. 4. As a result, the display of mobile device 50 can be switched from the visible state to the shielded state.

The display state switching unit 14 may maintain the display of the mobile device 50 in the visible state if the driving behavior of the driver is detected before a certain period of time has elapsed since the request for the driving change was made. In this case, the display state switching unit 14 switches the display of the mobile device 50 from the visible state to the shielded state when the driving behavior of the driver is not detected even after a certain period of time elapses since the request for the driving change is made. The certain period of time is not particularly limited. The certain period of time may be 30 seconds, 1 minute, or 2 minutes.

After switching the display of the mobile device 50 from the visible state to the shielded state, the display state switching unit 14 determines whether the driving behavior of the driver has been detected by the driving behavior detection unit 13. When the driving behavior of the driver is detected, the display state switching unit 14 returns the display of the mobile device 50 from the shielded state to the visible state. The display state switching unit 14 may be configured to return the display of the mobile device 50 from the shielded state to the visible state after a certain period of time has elapsed since the driving behavior of the driver was detected. The display state switching unit 14 returns the display of the mobile device 50 from the shielded state to the visible state by sending a control signal to the mobile device case 1.

The display state switching unit 14 may add the end of autonomous driving control as a return condition of the display of the mobile device 50. For example, when the driving behavior of the driver is detected and autonomous driving control is ended, the display state switching unit 14 returns the display of the mobile device 50 from the shielded state to the visible state. The display state switching unit 14 may operate in a manner in which the display of the mobile device 50 is returned from the shielded state to the visible state after the driving behavior of the driver is detected and a certain period of time elapses after the autonomous driving control ends.

Control Method for Autonomous Driving System

Figure 5:
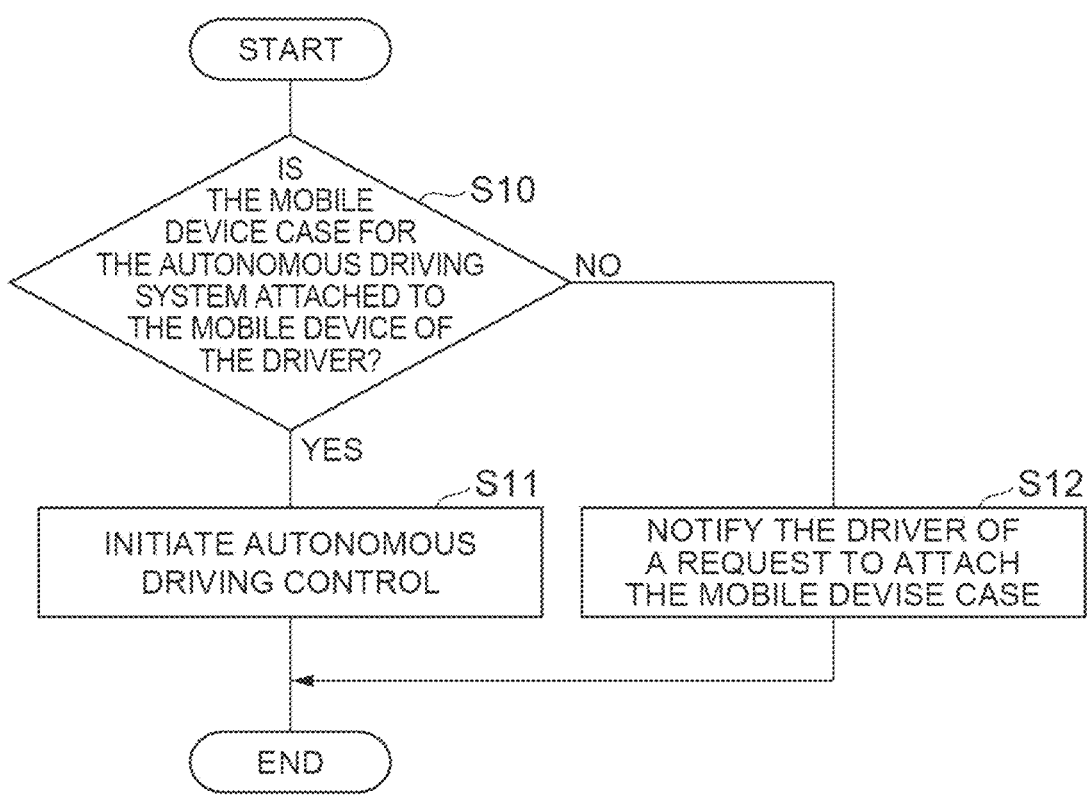
FIG. 5 is a flowchart illustrating an example of autonomous driving control start processing of an autonomous driving system.

Next, a control method for the autonomous driving system 100 according to the present embodiment will be described with reference to the drawings. FIG. 5 is a flowchart illustrating an example of autonomous driving control start processing of the autonomous driving system 100. The autonomous driving control start processing is performed, for example, when the driver performs an autonomous driving control start operation and the autonomous driving control start requirements other than the case attachment is satisfied. As illustrated in FIG. 5, the autonomous driving ECU 10 of the autonomous driving system 100 determines whether or not the mobile device case 1 is attached to the mobile device 50 of the driver by the attachment determination unit 11 in S10. The attachment determination unit 11 determines that the mobile device case 1 is attached to the mobile device 50 based on, for example, a signal transmitted from IC 20. The autonomous driving ECU 10 transitions to S11 if it is determined that the mobile device 50 is attached to the mobile device case 1 for autonomous driving system 100. The autonomous driving ECU 10 transitions to S12 if it is not determined that the mobile device 50 has been fitted into the mobile device case 1.

In S11, the autonomous driving ECU 10 initiates autonomous driving control of the vehicles. For example, the autonomous driving ECU 10 performs autonomous driving control by controlling a steering actuator, a drive actuator, and a brake actuator based on a travel plan generated in advance. Thereafter, the autonomous driving ECU 10 ends autonomous driving control start processing.

In S12, the autonomous driving ECU 10 notifies the driver of a request to attach the mobile devise case. The autonomous driving ECU 10 informs the driver that it is necessary to attach the mobile device case 1 to the mobile device 50 by text display or voice output of the HMI 15. Thereafter, the autonomous driving ECU 10 ends the current process and repeats the process from S10 after a certain period of time.

Figure 6:
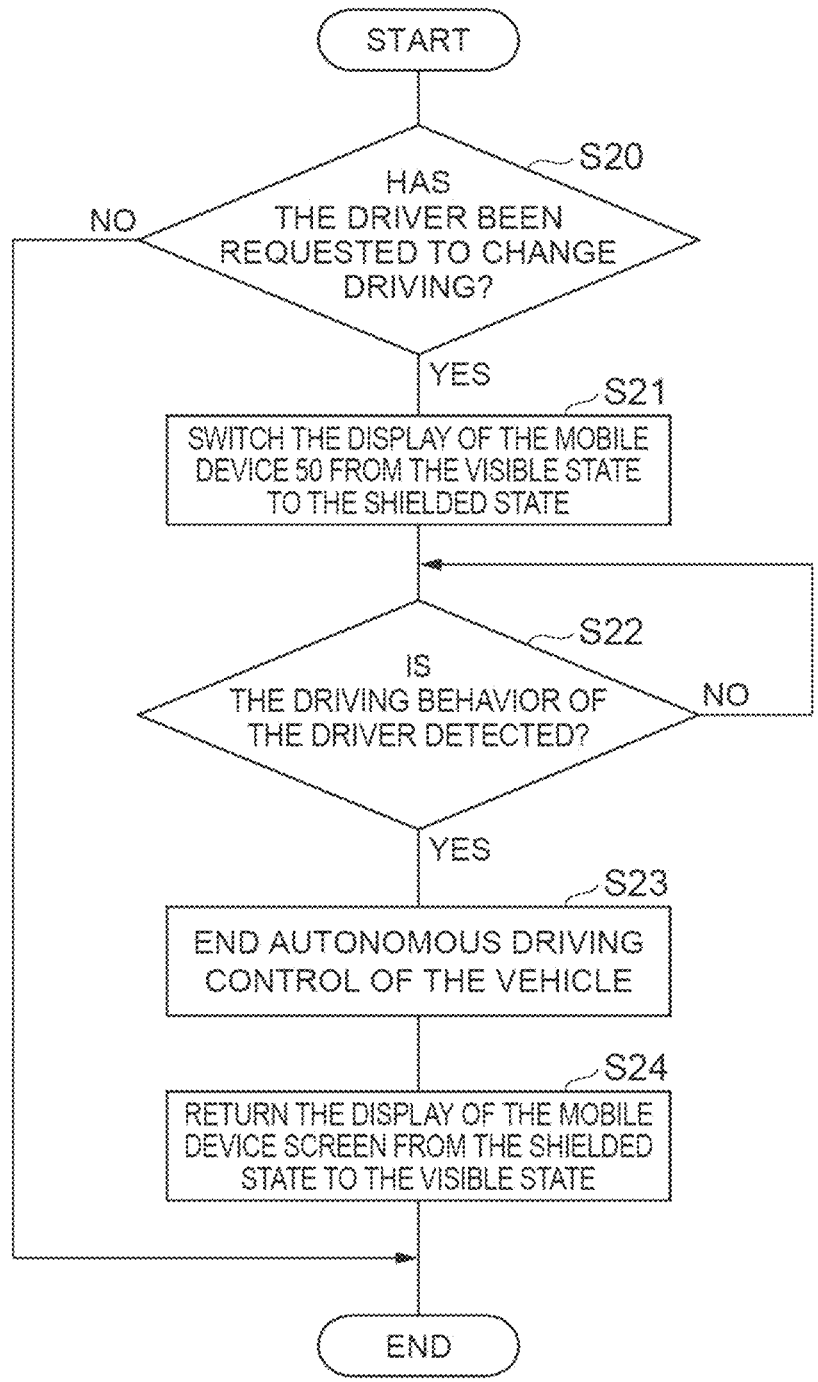
FIG. 6 is a flowchart illustrating an example of driving change request processing of an autonomous driving system.

FIG. 6 is a flowchart illustrating an example of driving change request processing of an autonomous driving system. The driving change request processing is performed during execution of autonomous driving control of the vehicle.

As illustrated in FIG. 6, the autonomous driving ECU 10 determines whether or not the driving change determination unit 12 has requested the driver to change driving (transition from autonomous driving to manual driving) in S20. If it is determined that the driver is requested to change driving, the autonomous driving ECU 10 proceeds to S21. If it is not determined that the autonomous driving ECU 10 has requested a driving change from the driver, the driving change request processing is terminated. If the autonomous driving control is continued, the autonomous driving ECU 10 repeats the process from S20 after a certain period of time.

In S21, the autonomous driving ECU 10 switches the display of the mobile device 50 from the visible state to the shielded state by the display state switching unit 14. The display state switching unit 14 switches the display of the mobile device 50 from the visible state to the shielded state by the opening and closing mechanism 2 of the mobile device case 1. The display state switching unit 14 may switch the display of the mobile device 50 from the visible state to the shielded state by the variable transmittance screen 7 of the mobile device case 6 shown in FIG. 4. The autonomous driving ECU 10 then transitions to S22.

In S22, the autonomous driving ECU 10 determines whether the driving behavior of the driver is detected by the driving behavior detection unit 13. When it is determined that the driving behavior of the driver is detected, the autonomous driving ECU 10 proceeds to S23. When it is not determined that the driving behavior of the driver is detected, the autonomous driving ECU 10 repeats the determination of S22. Note that the autonomous driving ECU 10 may end the driving change request processing and enter the emergency support mode in a case where the driving behavior of the driver is not detected even after a predetermined period has elapsed. In the emergency support mode, autonomous driving is terminated, and emergency evacuation is performed in which vehicles are stopped on road shoulders or spaces on roads without returning the display of the mobile device to the visible state.

In S23, the autonomous driving ECU 10 ends autonomous driving control of the vehicle. The autonomous driving ECU 10 notifies the driver via the HMI 15 that the autonomous driving control has ended. The autonomous driving ECU 10 then transitions to S24.

In S24, the autonomous driving ECU 10 causes the display state switching unit 14 to return the display of the mobile device 50 from the shielded state to the visible state. The display state switching unit 14 returns the display of the mobile device 50 from the shielded state to the visible state by controlling the opening and closing mechanism 2 or the variable transmittance screen 7. Thereafter, the autonomous driving ECU 10 ends the driving change request processing. If the autonomous driving control is continued, the autonomous driving ECU 10 repeats the process from S20 after a certain period of time.

In the flowchart of FIG. 6, the return processing to the visible state in S24 may be performed before the autonomous driving control end in S23.

Figure 7:
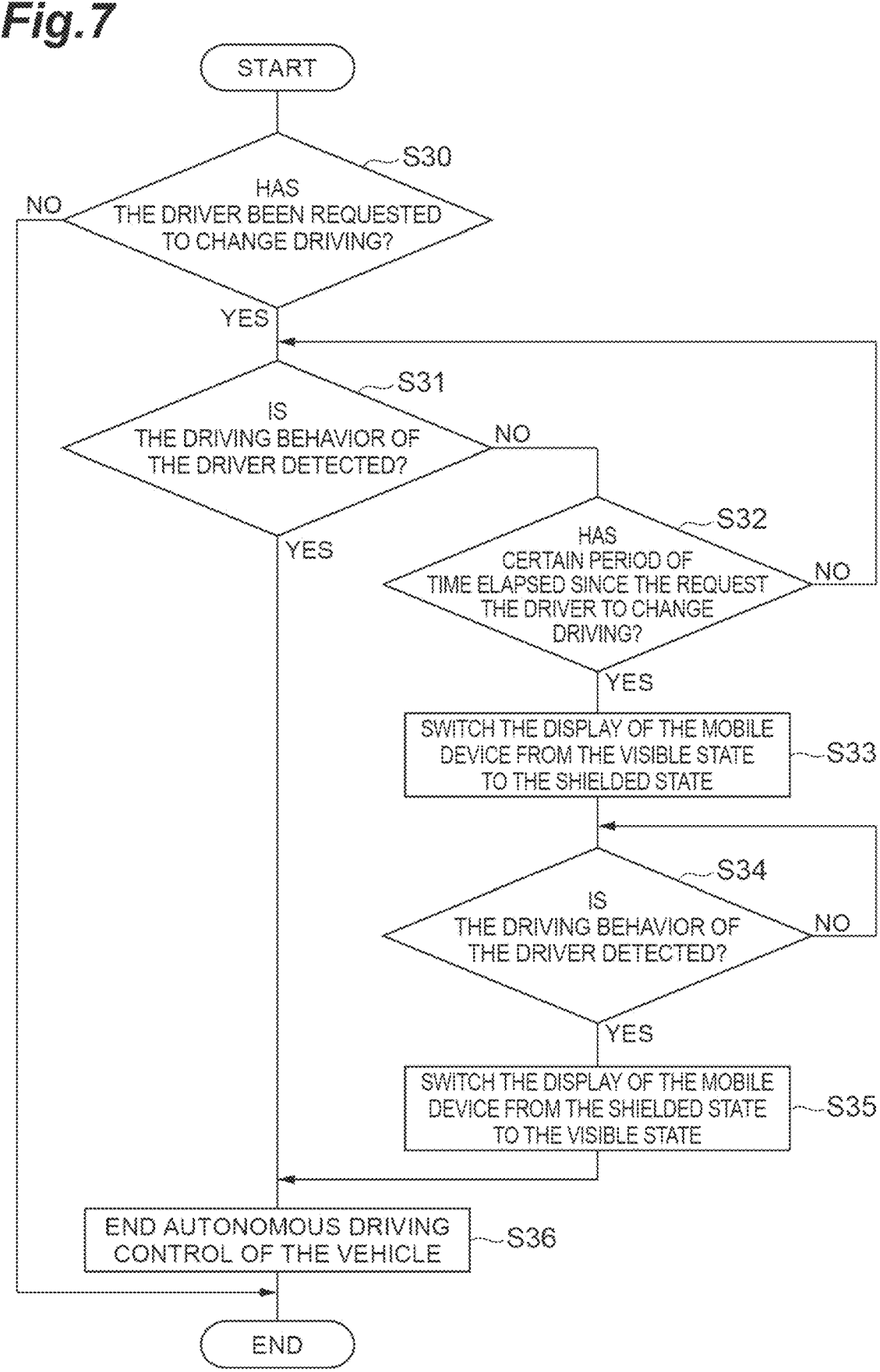
FIG. 7 is a flowchart illustrating another example of driving change request processing of the autonomous driving system.

FIG. 7 is a flowchart illustrating another example of driving change request processing of the autonomous driving system. As illustrated in FIG. 7, the autonomous driving ECU 10 determines whether or not the driving change determination unit 12 has requested the driver to change driving as a S30. If it is determined that the driver is requested to change driving, the autonomous driving ECU 10 transitions to S31. If it is not determined that the autonomous driving ECU 10 has requested a driving change from the driver, the driving change request processing is terminated. If the autonomous driving control is continued, the autonomous driving ECU 10 repeats the process from S30 after a certain period of time.

In S31, the autonomous driving ECU 10 determines whether the driving behavior of the driver is detected by the driving behavior detection unit 13. If it is determined that the driving behavior of the driver is detected, the autonomous driving ECU 10 transitions to S36. If it is not determined that the driving behavior of the driver is detected, the autonomous driving ECU 10 transitions to S32.

In S32, the autonomous driving ECU 10 determines whether a certain period of time has elapsed since the request the driver to change driving. If it is determined that a certain period of time has elapsed since the request, the autonomous driving ECU 10 transitions to S33. If it is not determined that a certain period of time has elapsed since the request, the autonomous driving ECU 10 returns to S31 and repeats the determination.

In S33, the autonomous driving ECU 10 switches the display of the mobile device 50 from the visible state to the shielded state by the display state switching unit 14. The autonomous driving ECU 10 then transitions to S34.

In S34, the autonomous driving ECU 10 determines whether or not driving behavior of the driver is detected by the driving behavior detection unit 13. When it is determined that the driving behavior of the driver is detected, the autonomous driving ECU 10 transitions to S35. When it is not determined that the driving behavior of the driver is detected, the autonomous driving ECU 10 repeats the determination of S34.

Note that the autonomous driving ECU 10 may end the driving change request processing if the driving behavior of the driver is not detected even after a predetermined period of time has elapsed. In this case, the autonomous driving ECU 10 may enter an emergency support mode. In the emergency support mode, autonomous driving is terminated, and emergency evacuation is performed in which vehicles are stopped on road shoulders or spaces on roads without returning the display of the mobile device to the visible state.

In S35, the autonomous driving ECU 10 causes the display state switching unit 14 to return the display of the mobile device 50 from the shielded state to the visible state. The autonomous driving ECU 10 then transitions to S36.

In S36, the autonomous driving control of the vehicle is ended. The autonomous driving ECU 10 notifies the driver via the HMI 15 that the autonomous driving control has ended. If the autonomous driving control is continued, the autonomous driving ECU 10 repeats the process from S30 after a certain period of time.

In the flowchart of FIG. 7, the autonomous driving control may be ended after S34 and before S35.

According to the autonomous driving system 100 of the present embodiment described above, the display of the mobile device 50 is switched from the visible state to the shielded state when the driver is requested to perform a driving operation during autonomous driving control. As a result, in the autonomous driving system 100, even if the driver concentrates on the operation of the mobile device 50, the driver's attention can be directed to taking over the driving.

Also, according to the autonomous driving system 100, autonomous driving control is not initiated unless a mobile device case for the autonomous driving system is installed on a mobile device. Therefore, in the autonomous driving system 100, the driver can attach the mobile device case 1 for autonomous driving system to the mobile device to start autonomous driving control.

Further, in the autonomous driving system 100, the opening and closing mechanism 2 of the mobile device case 1 can mechanically switch the display of the mobile device 50 from a visible state to a shielded state. Alternatively, in the autonomous driving system 100, the display of the mobile device 50 may be switched from the visible state to the shielded state with a simple configuration by changing the transmittance of the variable transmittance screen 7 of the mobile device case 6.

According to the autonomous driving system 100, after the display of the mobile device 50 is switched from the visible state to the shielded state, when the driving behavior of the driver is detected, the display of the mobile device 50 is returned from the shielded state to the visible state. Thus, in the autonomous driving system 100, it is possible to shorten the time in which the driver cannot determine the urgency of the notification content because the screen cannot be visually recognized when the notification arrives at the mobile device. The above effects can also be obtained in the control method for the autonomous driving system 100 and the mobile device case 1.

Although embodiments of the present disclosure have been described above, the present disclosure is not limited to the above-described embodiments. The present disclosure can be implemented in various forms in which various changes and modifications are made based on the knowledge of those skilled in the art, including the above-described embodiments.

The mobile device case 1 is not limited to the configuration shown in the drawings. The mobile device case 1 may be configured such that the mobile device connection terminal 4 is provided on the lid part 1a shown in FIG. 2A or the lid part 6a shown in FIG. 4. It may be acceptable for the IC-box 5 to be provided instead of the mobile device connection terminal 4. Further, the mobile device case 1 is not limited to a box-shaped or frame-shaped case. The mobile device case 1 may be configured to include the variable transmittance screen 7, the mobile device connection terminal 4, and the IC-box 5 shown in FIG. 4.

Note that the autonomous driving ECU 10 does not need to determine whether the mobile device case 1 is mounted in the mobile device 50, and a signal transmitted from the IC 20 when the case is mounted may be handled as a permission signal for starting autonomous driving control.

The autonomous driving system 100 need not necessarily have the mobile device case 1. The autonomous driving system 100 may switch the display of the mobile device 50 from the visible state to the shielded state by connecting communication with the mobile device 50 and controlling the mobile device 50. The autonomous driving system 100 may place the display in a shielded state with a display control that locks the display of the mobile device 50. The autonomous driving system 100 may be connected to the mobile device 50 by wireless communication, or may be connected to the mobile device 50 by wire.

The mobile device case 1 may be configured to send a signal to the autonomous driving system 100 if removed from the mobile device 50 during autonomous driving control. The autonomous driving system 100 may inform the driver that the mobile device case 1 has been removed from the mobile device 50. After a certain period of time from the notification, the autonomous driving system 100 may cause the autonomously driving controlled vehicles to perform an emergency evacuation to a road shoulder or the like and then stop. Alternatively, the mobile device case 1 may have a powered locking feature. The mobile device case 1 may be locked against removal from the mobile device 50 by a signal from the autonomous driving system 100 while the vehicle is running.

The autonomous driving system 100 may switch the display of the mobile device 50 from the visible state to the shielded state and then may not return the display of the mobile device 50 from the shielded state to the visible state during manual driving of the driver. The manual driving includes driving during execution of driving support control in which the driver is requested to monitor the surroundings. The autonomous driving system 100 may return the display of the mobile device 50 from the shielded state to the visible state if autonomous driving control is initiated again.

What is claimed is:

1. An autonomous driving system connected communicably to a mobile device of a driver or to a mobile device case attached to the mobile device, and configured to perform autonomous driving control, the system comprising:
 a display cover of the mobile device case, capable of switching a display of the mobile device between a visible state and a shielded state,
 wherein the display of the mobile device is switched from the visible state to the shielded state by controlling the mobile device or the mobile device case, when the driver is requested to perform a driving operation of a vehicle during the autonomous driving control.

2. The autonomous driving system according to claim 1, wherein the autonomous driving system is connected communicably to the mobile device case, and
 wherein the autonomous driving control is not initiated unless the mobile device case is attached to the mobile device.

3. The autonomous driving system of claim 2, wherein the display cover includes an opening and closing mechanism capable of obscuring a display of the mobile device, and wherein the display of the mobile device is switched from the visible state to the shielded state by obscuring the display using the opening and closing mechanism.

4. The autonomous driving system according to claim 2, wherein the display cover includes a variable transmittance screen covering the display of the mobile device, and the display is switched from the visible state to the shielded state by changing a transmittance of the variable transmittance screen.

5. The autonomous driving system according to claim 1, wherein the display of the mobile device is returned from the shielded state to the visible state when the driving operation of the driver is detected after the display of the mobile device is switched from the visible state to the shielded state.

6. The autonomous driving system according to claim 2, wherein the display of the mobile device is returned from the shielded state to the visible state when the driving operation of the driver is detected after the display of the mobile device is switched from the visible state to the shielded state.

7. A control method for an autonomous driving system connected communicably to a mobile device of a driver or to a mobile device case attached to the mobile device, and configured to perform autonomous driving control, the method comprising:
 switching a display of the mobile device from a visible state to a shielded state by controlling the mobile device or the mobile device case, when the driver is requested to perform a driving operation of a vehicle during the autonomous driving control,
 wherein the mobile device case includes a display cover capable of switching the display of the mobile device between the visible state and the shielded state.

8. A mobile device case for an autonomous driving system connected communicably to the autonomous driving system of a vehicle and attached to a mobile device of a driver of the vehicle, the mobile device case comprising:
 a display cover disposed with respect to a display of the mobile device and capable of switching the display between a visible state and a shielded state,
 wherein the display of the mobile device is switched from the visible state to the shielded state by controlling the mobile device or the mobile device case, when the driver is requested to perform a driving operation of the vehicle during autonomous driving control.

9. The mobile device case of claim 7, wherein the autonomous driving control is not initiated by the autonomous driving system unless the mobile device case is attached to the mobile device.

10. The mobile device case according to claim 7, further comprising an opening and closing mechanism capable of obscuring a display of the mobile device, wherein the display of the mobile device is switched from the visible state to the shielded state by obscuring the display using the opening and closing mechanism.

11. The mobile device case according to claim 8, further comprising an opening and closing mechanism capable of obscuring a display of the mobile device, wherein the display of the mobile device is switched from the visible state to the shielded state by obscuring the display using the opening and closing mechanism.

12. The mobile device case according to claim 7, further comprising a variable transmittance screen covering the display of the mobile device, wherein the display is switched from the visible state to the shielded state by changing a transmittance of the variable transmittance screen.

13. The mobile device case according to claim 8, further comprising a variable transmittance screen covering the display of the mobile device, wherein the display is switched from the visible state to the shielded state by changing a transmittance of the variable transmittance screen.

14. The mobile device case according to claim 7, wherein the display of the mobile device is returned from the shielded state to the visible state when the autonomous driving system detects a driving operation of the driver, after the display of the mobile device is switched from the visible state to the shielded state.

15. The mobile device case according to claim 8, wherein the display of the mobile device is returned from the shielded state to the visible state when the autonomous driving system detects a driving operation of the driver, after the display of the mobile device is switched from the visible state to the shielded state.

* * * * *